INVENTOR.
THOMAS E. O'CONNOR
BY Herbert L. Davis
ATTORNEY

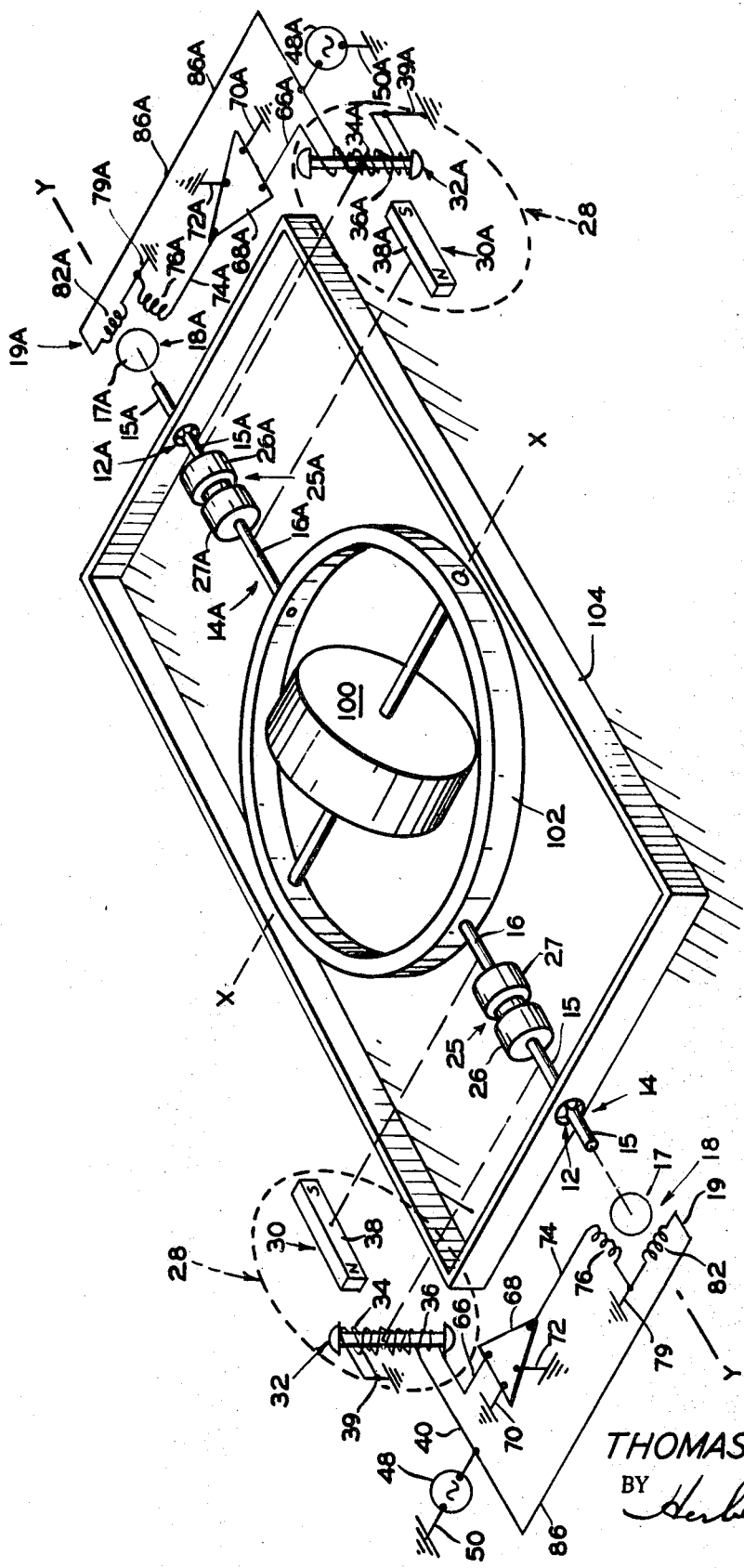

United States Patent Office 3,534,616
Patented Oct. 20, 1970

3,534,616
ANTIFRICTION BEARING WITH COMPENSATING
MOTOR AND FLEXURE PIVOT
Thomas E. O'Connor, Hawthorne, N.J., assignor to The
Bendix Corporation, a corporation of Delaware
Filed Jan. 17, 1968, Ser. No. 698,563
Int. Cl. G01c 19/18
U.S. Cl. 74—5                                    8 Claims

ABSTRACT OF THE DISCLOSURE

An antifriction bearing with compensating motor and flexure pivot, including a shaft supporting a load and mounted in a suitable ball bearing arrangement with a flexural pivot device operatively connected in the shaft intermediate the load and the bearing with a torquer motor drivingly connected to that portion of the support shaft at the bearing side of the support shaft and electrically connected by an amplifier and electronic stabilization network to an output signal provided by an angularly positioned transducer. The transducer including signal elements angularly positioned by relative angular movement of one or the other of the portions of the supporting shaft at opposite sides of the flexural pivot device so that the transducer in effect converts the flexure of the pivot device into a proportional electrical voltage signal which is amplified by the amplifier and fed to the torque motor so as to cause the motor to angularly position that portion of the support shaft at the bearing side of the supporting shaft and in a sense to decrease the deflection of the flexural pivot and thereby provide a feedback loop which is closed around the flexural pivot and the transducer so that the deflection of the flexural pivot may in effect be always kept nearly at null by the action of the torquer motor so that torque transmitted to the load due to friction at the bearing may be considered of a negligible effect and the bearing substantially frictionless.

BACKGROUND OF THE INVENTION

Field of the invention

This invention relates to an electromechanical device to reduce undesirable torques in certain types of rotary supports, and more particularly, to an antifriction bearing with compensating motor for a flexural pivot to reduce undesirable torques in certain types of rotary supports, which may be due to bearing friction and a device which would be particularly useful as a support in a low friction application such as a gyroscope.

Description of the prior art

Heretofore, complex mechanism has been provided to compensate for the restraining torque affected by flexure pivots utilized in gyroscopes in place of ball bearings for the precession or gimbal axis of the gyroscope, as disclosed and claimed in a U.S. Pat. No. 3,264,880, granted Aug. 9, 1966, to Eduard M. Fischel. The disclosure of the patent is directed particularly to a means for compensating for torques developed in a gyroscopic apparatus by flexural pivots so as to provide through the operation of the compensating means frictionless bearings for rotary shafts in the gyroscope and thus minimize or eliminate undesirable torques introduced in the system by flexural pivots, but the disclosure of the patent fails to suggest the combination of a flexural pivot with a roller bearing assembly together with a transducer control signal for a torquer motor to decrease the flexure of the pivot, as in the present invention.

Furthermore, U.S. Pat. No. 3,048,044, granted Aug. 7, 1962, to Paul R. Adams et al., involves a very complex system and a sensing means in which a vertical support wire of the disclosed arrangement must not only sense a relatively minute strain caused by friction torques of a rotary support, but also a strain caused by the weight of a gimbal of a gyroscope and involves the measurement of minute variations in a relatively large voltage output of the sensor and a distinctly different idea means from that of the simplified structural arrangement of the present invention.

U.S. Pat. No. 2,928,281, granted Mar. 15, 1960, to Steven L. Burgwin et al., and U.S. Pat. No. 3,082,629, granted Mar. 26, 1963, to Arthur B. Jones, Jr., et al., are of general interest in showing various means of producing frictionless bearings to eliminate undesirable torques mechanically in such gyroscopic apparatus. Thus the disclosure of U.S. Pat. No. 2,928,281 accomplishes the result sought in a somewhat different manner by the summation of the bearing compliances while the disclosure of U.S. Pat. No. 3,082,629 accomplishes the frictionless feature by effecting a reverse rotation of the bearing parts.

There has been further noted a U.S. Pat. No. 3,059,343, granted Oct. 23, 1962, to David W. Kermode, as of interest in defining an electrical method of nullifying starting torques by rotatably oscillating the bearings of a shaft support in a gyroscope.

Heretofore low friction levels in a rotary bearing support were obtained by means of exotic designs such as rotating race bearings or fluid bearings while the present invention permits the use of a less critical type of rotary support such as ball or journal bearings.

There is no suggestion in the disclosures of the aforenoted patents of the simplified torque compensating means herein provided operably controlled by an angularly positioned transducer arranged in parallel relation to a flex-pivot connected in a load bearing rotary shaft supported in a roller bearing assembly as in the present invention.

The present invention resides in a concept which simplifies complex mechanisms and reduces the number of necessary parts, while at the same time raising the percent of durability and certainty of operation so as to effect a condition of greater durability and one which is more sure to produce practically the same result and not only greater certainty, but with less expense.

SUMMARY OF THE INVENTION

An object of the present invention is to provide a simplified electromechanical device to greatly reduce undesirable torques in certain types of rotary supports, and particularly, torques due to bearing friction.

Another object of the invention is to provide an electromechanical device of simplified structure to reduce undesirable torques in bearing friction of rotary supports in a low friction application such as a gyroscope.

Another object of the invention is to provide an electromechanical device to reduce undesirable torques in less critical type rotary supports such as ball or journal bearings through the use of a flexural pivot device and means responsive to the flexure of the pivot device to decrease the deflection of the flexure pivot in a sense to keep the deflection of the flexure pivot nearly at null so that torques transmitted thereby to the load may be considered negligible and the bearing effectively frictionless.

Another object of the invention is to provide in the aforenoted electromechanical device a torque motor positioned at the bearing side of the support shaft so as to decrease the deflection of the flex-pivot in response to an output signal provided by a transducer connected in parallel to the flex-pivot. The output signal being proportional to the deflection of the flex-pivot so as to cause the motor to drive the flex-pivot in such a sense that the flex-pivot is always kept nearly at null so that the torques transmitted to the load may be considered negligible and the bearing effectively frictionless.

3

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings in which corresponding numerals indicate corresponding parts:

FIG. 2 is a schematic wiring diagram and electromechanical illustration showing an anti-friction bearing assembly with compensating motor and flexure pivot in the supporting shaft arrangement of the present invention as applied to a gyroscope.

DESCRIPTION OF THE EMBODIMENTS OF THE INVENTION

Figure 1:
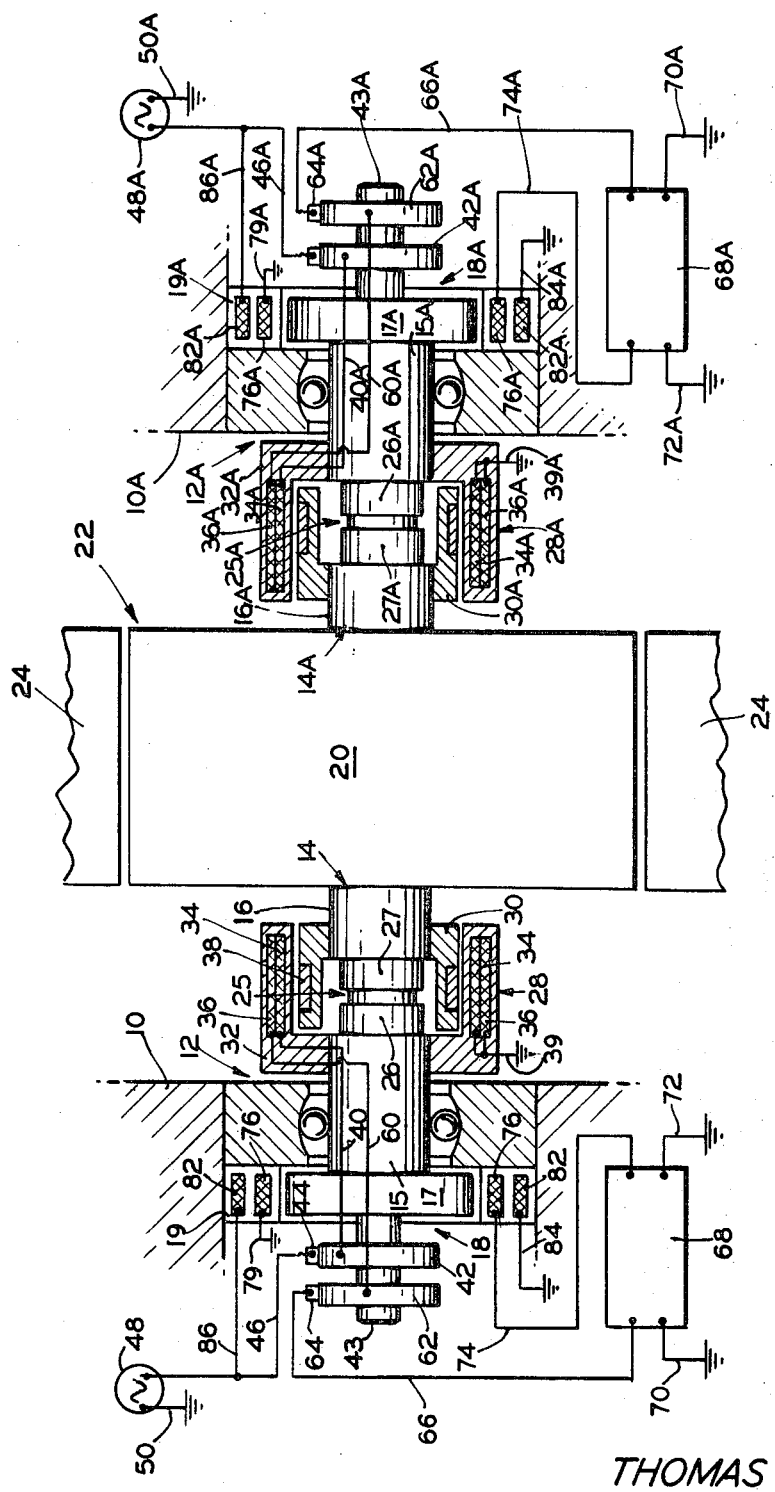
FIG. 1 is a schematic electromechanical showing of an anti-friction bearing assembly with a compensating motor and flexure pivot connected in a supporting shaft arrangement embodying the present invention.

Referring to FIG. 1, there is indicated generally by the numeral 10 a frame which serves as a housing for a rotary support such as a ball bearing 12 for a shaft 14. The shaft 14 includes shaft portions 15 and 16. The shaft portion 15 is rotatably supported in the bearing 12 and is operably connected to a rotor 17 of a torquer motor 18 having a stator 19. The shaft portion 16 is operatively connected to a rotor element 20 of a motor or load 22 having a stator portion 24. The shaft portions 15 and 16 are operatively connected by a flexural pivot 25 having portions 26 and 27 which may be angularly flexed relative one to the other and operably connected, respectively, to the shaft portions 15 and 16. The flexural pivot 25 may be of a type such as disclosed and claimed in a U.S. Pat. No. 3,073,584 granted Jan. 15, 1963 to Henry Troeger and assigned to The Bendix Corporation. The flexural pivot 25 is designed to carry high radial and axial loads, but has extremely low torsional stiffness in the angular flexure of the portions 26 and 27 of the flexural pivot 25 relative one to the other.

An angularly positioned electromechanical transducer 28 is arranged to convert the relative angular flexure of the portions 26 and 27 of the pivot 25 into a proportional electrical voltage output signal.

The transducer 28 is designed to apply negligible reaction torque on the support shaft 14 and includes a pair of angularly positioned rotor elements movable one relative to the other, including a first rotor element 30 which may be affixed to the shaft portion 16 and a second housing or rotor element 32 which may be affixed to the shaft portion 15.

The transducer 28 may be of a type such as disclosed in a U.S. Pat. No. 3,132,315 granted May 5, 1964 to F. Henry S. Rossire and assigned to The Bendix Corporation, or the transducer 28 may be of any suitable type well known in the art and, as shown herein, is of a variable reluctance type including a primary winding 34 and a secondary winding 36 inductively coupled thereto with both windings being carried by the rotor or housing element 32. Further, a bar magnet 38 may be carried by the other rotor element 30 in cooperative relation with the primary and secondary windings 34 and 36 of the rotor element 32.

The flexural pivot 25 is so arranged as to normally center the rotor element 30 within the housing element 32 in a non-signal developing position relative to the inductive windings 34 and 36. However, upon an angular adjustment of the rotor element 30 relative to the rotor or housing element 32 the magnetic reluctance in the rotor element 32 may be varied so as to cause the primary winding 34 to induce into the secondary winding 36 of the rotor element 32 an alternating current electrical signal applied to a output of the secondary winding 36 of a phase and magnitude dependent upon the sense and magnitude of the angular adjustment of the rotor element 30 in relation to the rotor element 32 of the transducer 28.

In the arrangement of the transducer 28, shown in the drawing of FIG. 1, the primary winding 34 is connected by an electrical conductor 39 to ground and through an electrical conductor 40 to a slip ring 42 mounted on a shaft 43 projecting from the rotor 17 of the torquer motor 18. The slip ring 42 is further electrically connected through a brush 44 cooperating with the slip ring 42 and an electrical conductor 46 to one terminal of a suitable source of alternating current 48 having an opposite terminal connected through a conductor 50 to ground so that the primary winding 34 is electrically connected across the source of alternating current 48.

Further, the secondary winding 36 of the rotor element 32 is electrically connected at one terminal to ground through the electrical conductor 39 and at an opposite terminal through an electrical conductor 60 to a slip ring 62 carried by the shaft 43 projecting from the rotor 17 of the torquer motor 18. The slip ring 62 is in turn electrically connected through a brush 64 cooperating with the slip ring 62 and a conductor 66 to an input terminal of an amplifier and electronic stabilization network 68. An opposite input terminal of the amplifier and electronic stabilization network 68 is connected through a conductor 70 to ground. Thus the output terminals of the secondary winding 36 are connected across the input terminals to the amplifier network 68.

Output terminals of the amplifier network 68 are connected through a conductor 72 to ground and through a second conductor 74 to a terminal of a control winding 76 of the torquer motor 18 which may be of a conventional two-phase reversible torquer type. An opposite terminal of the control winding 76 is connected by a conductor 79 to ground. The torquer motor 18 has the rotor 17 thereof operatively connected to the portion 15 of the shaft 14 supported by the roller bearing 12. A fixed phase winding 82 of the torquer motor 18 is connected through a grounded conductor 84 and a conductor 86 across the source of alternating current 48.

The amplifier and electronic stabilization network 68 is arranged to connect the output of the angular positioned transducer 28 to the control winding 76 of the torquer motor 18 so as to control the sense and magnitude of the torque applied by the rotor 17 of the motor 18 to the portion 15 of the shaft 14.

In the operation of the anti-friction bearing device of FIG. 1, it will be seen that as a load is applied by the rotor 20 of the motor 22 to the portion 16 of the shaft 14 so as to effect rotation of the shaft portion 16 relative to the frame portion 10 torques will be transmitted to the other portion 15 of the shaft 14 by the friction of the ball bearing assembly 12 on the portion 15 of the shaft 14.

These torques will then cause the flex-pivot 25 to deflect in torsion whereupon the rotor element 30 of the transducer 28 will be angularly positioned relative to the other rotor element 32 of the transducer 28 causing then the transducer 28 to produce a voltage signal output proportional to this deflection. This signal voltage output will then be amplified in the amplifier 68 and fed to the control winding 76 of the torquer motor 18.

The signal voltage thus applied to the control winding 76 of the torquer motor 18 will be of a phase sense dependent upon the sense of the relative deflection of the rotor elements 30 and 32 of the transducer 28 and of a magnitude proportional to the magnitude of such relative deflection so as to cause the rotor 17 of the torquer motor 78 to apply an angular torque to the portion 15 of the shaft 14 rotatably carried by the bearing 12 in such a sense and of a magnitude proportional to the controlling deflection so as to decrease the deflection of the flex-pivot 25 while angularly torquing the rotor element 32 of the transducer 28 in a sense to correspond to the angular deflection of the rotor element 30 so as to compensate for opposing frictional forces applied to the portion 15 of the shaft 14 by the ball bearing assembly 12.

Thus a feedback loop is closed around the flex-pivot 25 and the transducer 28 so as to effect the flex-pivot 25 in such a manner that the deflection thereof is always kept nearly at null so that the torques transmitted by the roller bearing 12 through the shaft portion 15 and thereby through the flex-pivot 25 to the portion 16 of the shaft 14 of the motor 22 may be considered negligible and the bearing effectively "frictionless."

In the aforenoted arrangement, it may be noted that the torquer motor 18 can in no sense drive the load or rotor 20 of the motor 22 (due to the "free-flex" action of the pivot 25), but rather the torquer motor 18 can only serve to cancel the friction in the roller bearing support 12.

While in the drawing of FIG. 1, the shaft 14 is shown projecting from one side of the rotor 20 a corresponding shaft 14A may be arranged to project from an opposite side of the rotor 20 for support by a ball bearing assembly 12A having corresponding compensating bearing means to that heretofore described with reference to the shaft 14 in which corresponding parts have been indicated by like numerals bearing the suffix A.

In the form of the invention illustrated schematically in FIG. 2, the invention of FIG. 1 is shown applied to a gyroscope in which corresponding numerals indicate corresponding parts to those heretofore described with reference to FIG. 1. However, in the aforenoted arrangement, there is shown a gyro rotor 100 of conventional type rotatably mounted on a spin axis X—X in a gimbal 102 and driven by conventional means not shown.

The gimbal 102 is in turn pivotally mounted an axis Y—Y extending perpendicular to the spin axis X—X and defined by the shafts 14 and 14A. The shafts 14 and 14A are mounted in the ball bearing assemblies 12 and 12A carried by a frame 104 which may be fixedly mounted as shown in FIG. 2.

Referring to the drawing of FIG. 2, the frame 104 acts as a housing for the rotary ball bearing supports 12 and 12A carrying the shaft 14 and 14A, respectively, to support the load or gimbal 102. The shaft 14 includes shaft portions 15 and 16, respectively, while the shaft 14A includes shaft portions 15A and 16A, respectively. The shaft portions 15 and 16 are attached to free-flex portions 26 and 27 while the shaft portions 15A and 16A are attached to free-flex portions 26A and 27A of the respective flexure pivots 25 and 25A.

The flexure pivots 25 and 25A are of a type designed to carry high radial and axial loads, but having extremely low torsional stiffness so that an angularly positioned transducer 28 and 28A may convert flexure of the pivots 25 and 25A into a proportional electrical output signal which is applied across lines 60–39 and 60A–39A of the transducer 28 and 28A, respectively. The transducer 28 and 28A are designed to apply negligible reaction torque on the respective supporting shafts 14 and 14A.

A torquer motor 18 and 18A is attached to the shaft portion 15 and 15A, respectively, of the shafts 14 and 14A carried by the bearings 12 and 12A so that the amplified output signals from the transducer 28 and 28A cause the torquer motors 18 and 18A, respectively, to be driven in a sense to decrease the deflection of the flexural pivot 25 and 25A, respectively.

Each of the antifriction compensating means operate as follows: As the load 102 and frame 104 are angularly positioned about the axis Y—Y relative to each other, torques will be transmitted to the load by the friction of the rotary support, for example, the bearing 12. These torques will then cause the flexural pivot 25 to deflect in torsion. The transducer 28 will then produce a voltage output across the output lines 66 and 39 proportional to the deflection. This output voltage is then amplified in the amplifier 68 and fed to the control winding 76 of the torquer motor 18. The amplified output voltage has a phase sense such as to cause the torquer motor 18 to position the portion 15 of the shaft 14 carried in the load bearing 12 in such a sense as to decrease the deflection of the flexural pivot 25.

There is thus provided a feedback loop which is closed around the flexural pivot 25 and the transducer 28 and acting in a sense tending to keep the deflection of the flexural pivot 25 always nearly at null so that the torque transmitted through the load provided by the gimball 102 may be considered negligible and the bearing 12 effectively frictionless.

It should be further noted that torquer motor 18 cannot be used to drive the load or gimbal 102 due to the flexural action of the pivot 25, but instead the torquer motor 18 serves only to drive the portion 15 of the shaft 14 in a sense only to cancel the friction in the bearing support 12.

While two embodiments of the invention have been illustrated and described, various changes in the form and relative arrangements of the parts, which will now appear to those skilled in the art, may be made without departing from the scope of the invention.

What is claimed is:

1. Means for detecting and counteracting torques in a flexural pivot means having first and second portions to be angularly flexed relative one to the other, torque applying means operably connected to the first portion of the flexural pivot, bearing means for supporting the second portion of the flexural pivot, electromechanical transducer means coupled to the first and second portions of the flexural pivot means for producing an electrical output signal of a sense and magnitude dependent upon the sense and magnitude of an angular flexure of the first portion of the flexural pivot means relative to the second portion of the flexural pivot means, reversible electric torquer motor means mechanically coupled to said second portion of the flexural pivot, means to electrically couple the electrical output signal from said transducer to said reversible torquer motor means to control sense and magnitude of torque applied by the motor means, the motor means being responsive to said electrical output signal to apply a compensating torque to said second portion of the flexural pivot in a directional sense and magnitude to counteract an angular deflection in torsion of the first portion of the flexural pivot relative to the second portion in opposition to frictional forces applied to the second portion by the bearing means.

2. In a transducer of a type including a first housing element having inductive windings mounted therein and a second element mounted in said housing element in cooperative relation to said windings for effecting an output signal, said first and second elements being angularly movable relative one to the other, flexural pivot means for supporting the second element within the first housing element and normally positioning said second element within said first element in a non-signal developing position relative to the inductive windings, said flexural pivot means including a first portion and a second portion angularly movable in torsion relative one to the other, said first portion of the flexural pivot means being operably connected to one of said transducer elements and the second portion of the flexural pivot means being operably connected to the other of said transducer elements, means for applying a torque to one of said transducer elements, bearing means for supporting the other of said transducer elements, said torque applying means being effective to angularly deflect said one element relative to said other element from said non-signal position in opposition to a frictional force applied by said bearing means to said other element, and said angular deflection of said one element relative to said other element causing said transducer to produce an output signal of a sense and magnitude dependent upon the sense and magnitude of the relative torsional deflection of said elements; the improvement comprising a torquer motor operatively connected to the other element supported by said bearing means, and means for connecting the output signal from said transducer to said torquer motor to render the motor effective to apply a torque to said other element of a sense and magnitude such as to counteract the frictional forces applied by the bearing means to said other element.

3. Means for compensating a ball bearing assembly for frictional forces applied to a shaft supporting a load, said shaft being of a type including a first portion, a second portion, and a flexural pivot device for operatively connecting the first and second portions of the shaft, the first portion of the shaft being connected to the load, the second portion of the shaft being mounted in the ball bearing assembly with the flexural pivot device being operatively connected in the shaft intermediate the load and the ball bearing assembly, an electromechanical transducer including first and second elements angularly deflectable relative one to the other from a null signal position to effect an electrical output signal, the first element of the transducer being operably connected to the first portion of the output shaft and the second element of the transducer being operably connected to the second portion of the output shaft, the flexural pivot device permitting relative angular deflection in torsion of the first and second elements of the transducer upon the load applying a torque to the first portion of the shaft in opposition to the frictional forces applied to the second portion of the shaft by the ball bearing assembly; the improvement comprising a torquer motor, means operatively connecting the torquer motor to the second portion of the shaft, and other means connecting the electrical output signal from the transducer to the torquer motor in such a manner as to cause the torquer motor to apply a torque to the second portion of the shaft supported by the ball bearing assembly in a sense to decrease the relative angular deflection in torsion of the first and second elements of the transducer permitted by the flexural pivot device so that the frictional forces applied at the ball bearing assembly to the second portion of the shaft and in opposition to the torque applied by the load to the first portion of the shaft may be effectively compensated.

4. The means for compensating a ball bearing assembly for frictional forces as defined by claim 3 in which the angular deflection of the first and second elements of the transducer relative one to the other from the null signal position as permitted by the flexural pivot device cause the transducer to produce an electrical voltage output signal of a sense corresponding to the sense of said deflection and of a magnitude proportional to the relative deflection of the respective transducer elements from the null signal position so as to cause the torquer motor to apply a torque to the second portion of the shaft acting in opposition to the frictional forces applied to the second portion of the shaft by the ball bearing assembly so as to effectively compensate the ball bearing assembly for such frictional forces.

5. The combination defined by claim 3 in which the load includes a gimbal of a gyroscope carrying a rotor element therein, the shaft being arranged for pivotally supporting the gimbal, and including the first portion of the shaft connected to the gimbal, the ball bearing assembly for supporting the second portion of the shaft, and the means for compensating the ball bearing assembly for frictional forces applied to the second portion of the shaft including the improvement.

6. The combination defined by claim 3 in which the load includes a gimbal carrying a rotor element therein, a pair of shaft for pivotally supporting the gimbal and including each shaft having the first portion of the shaft connected to the gimbal at opposite sides thereof, the ball bearing assembly being individual to each shaft for supporting the second portion of the shaft, and each ball bearing assembly including the improvement in the means for compensating the ball bearing assembly for frictional forces applied to the second portion of each of the shafts.

7. The combination defined by claim 4 in which the load includes a gimbal carrying a rotor element therein, a pair of shafts for pivotally supporting the gimbal, and including each shaft having the first portion of the shaft connected to the gimbal at opposite sides thereof, the ball bearing assembly being individual to each shaft for supporting the second portion of the shaft, and each ball bearing assembly including the improvement in the means for compensating the ball bearing assembly for frictional forces applied to the second portion of each of the shafts.

8. Means for detecting and counteracting torques in a flexural pivot means having first and second portions to be angularly flexed relative one to the other torque applying means operably connected to the first portion of the flexural pivot, bearing means for supporting the second portion of the flexural pivot, electromechanical transducer means coupled to the first and second portions of the flexural pivot means for producing an electrical output signal of a sense and magnitude dependent upon the sense and magnitude of an angular flexure of the first portion of the flexural pivot means relative to the second portion of the flexural pivot means, an electrical torquer means, means to mechanically couple the electrical torquer means to the second portion of the flexural pivot, amplifier means to electrically couple the output signal from the transducer means to the electrical torquer means so as to render the electrical torquer means responsive to said amplified output signal for causing the electrical torquer means to apply a compensating torque to said second portion of the flexural pivot acting in a sense and of a magnitude to counteract a deflection in torsion of the first portion of the flexural pivot relative to the second portion in opposition to frictional forces applied to the second portion by the bearing means.

References Cited

UNITED STATES PATENTS

| 2,893,247 | 7/1959  | Stern et al.    | 74—5 XR   |
| 2,956,436 | 10/1960 | Ellerman et al. | 74—5 XR   |
| 2,996,631 | 8/1961  | Evans           | 74—5 XR   |
| 3,218,872 | 11/1965 | Swainson        | 74—5 XR   |
| 3,264,880 | 8/1966  | Fischel         | 74—5      |
| 3,269,194 | 8/1966  | Buckley         | 74—5      |
| 3,304,789 | 2/1967  | Summers         | 74—5.45   |
| 3,336,811 | 8/1967  | Klemes et al.   | 74—5      |

FRED C. MATTERN, JR., Primary Examiner

M. A. ANTONAKAS, Assistant Examiner

U.S. Cl. X.R.

74—5.47

UNITED STATES PATENT OFFICE
CERTIFICATE OF CORRECTION

Patent No. 3,534,616          Dated October 20, 1970

Inventor(s) Thomas E. O'Connor

It is certified that error appears in the above-identified patent and that said Letters Patent are hereby corrected as shown below:

Claim 6, column 8, line 5 "shaft" should be - - shafts - -.

Claim 8, column 8, line 26 insert a comma (,) after "other".

SIGNED AND SEALED
DEC 29 1970

(SEAL)
Attest:

Edward M. Fletcher, Jr.
Attesting Officer

WILLIAM E. SCHUYLER, JR.
Commissioner of Patents